United States Patent [19]

Crawford

[11] 4,085,839
[45] Apr. 25, 1978

[54] APPARATUS FOR CONVEYING AND TURNING ARTICLES

[75] Inventor: Lynn D. Crawford, San Jose, Calif.

[73] Assignee: Genevieve I. Hanscom, Robert M. Magnuson & Lois J. Thomson, Trustees of the Estate of Roy M. Magnuson, all of San Jose, Calif.

[21] Appl. No.: 719,059

[22] Filed: Aug. 30, 1976

[51] Int. Cl.² .............................................. B65G 47/24
[52] U.S. Cl. ................................... 198/410; 198/411; 198/415; 198/416
[58] Field of Search ............... 198/415, 416, 417, 410, 198/411, 412

[56] References Cited

U.S. PATENT DOCUMENTS

| 907,116 | 12/1908 | Baker | 198/410 X |
| 1,616,101 | 2/1927 | Ackley | 198/415 X |
| 3,128,868 | 4/1964 | Bowen | 198/416 X |
| 3,209,887 | 10/1965 | Feldstein | 198/412 |
| 3,306,424 | 2/1967 | Fahrenbach | 198/415 X |
| 3,312,326 | 4/1967 | Huppenthal | 198/415 |
| 3,578,141 | 5/1971 | Sheehan | 198/415 |
| 3,799,319 | 3/1974 | Cutler | 198/416 |

Primary Examiner—Evon C. Blunk
Assistant Examiner—James L. Rowland
Attorney, Agent, or Firm—Gerald Moore

[57] ABSTRACT

Apparatus for conveying and rotating articles 90° while being conveyed along a predetermined path with rotation being achieved by contacting a forward corner of the article for pivoting it partially as the extending side will be grasped by a side-facing belt to complete rotation and propel the article forward.

6 Claims, 3 Drawing Figures

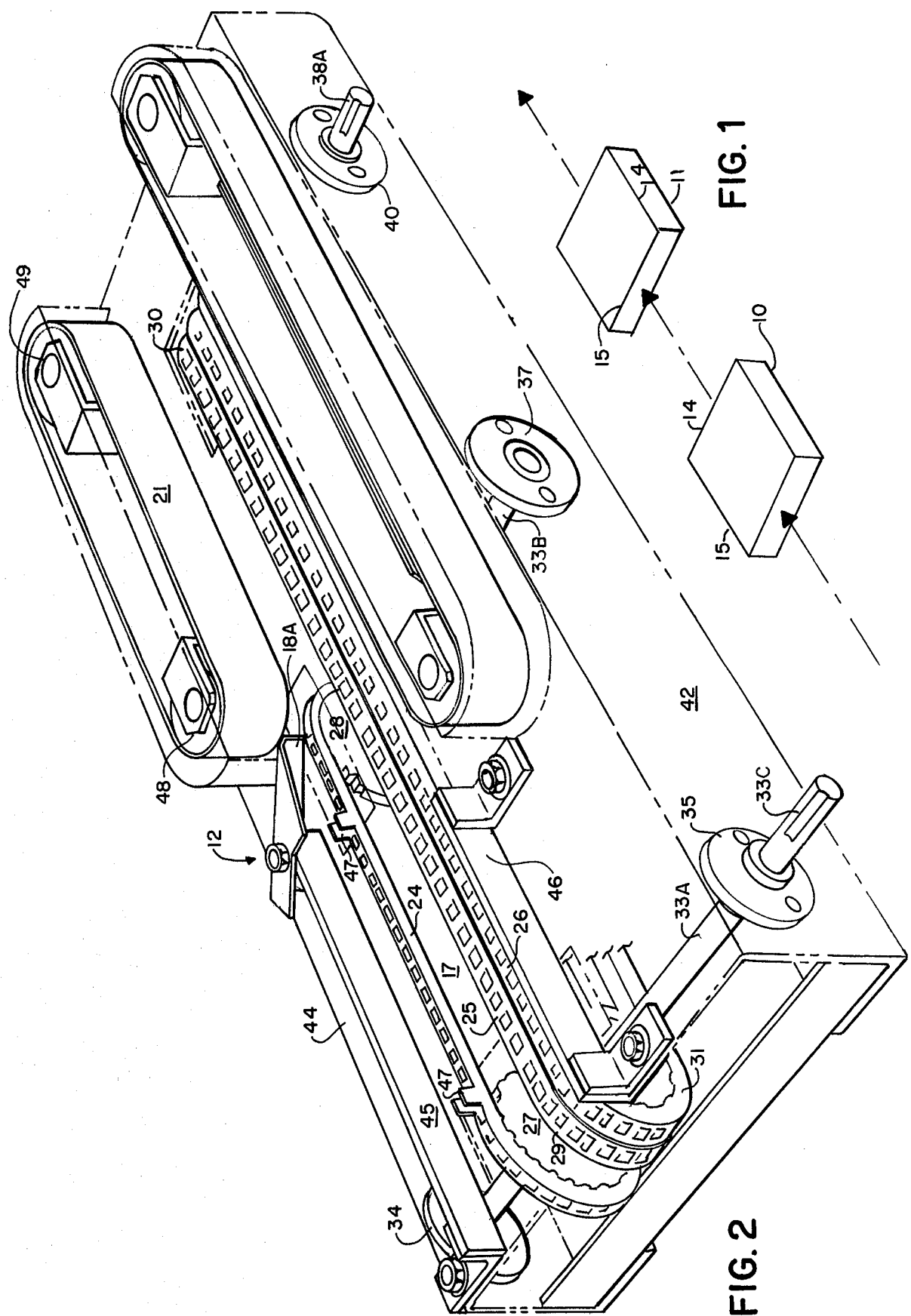

APPARATUS FOR CONVEYING AND TURNING ARTICLES

CROSS-REFERENCE TO RELATED APPLICATION

Patent Application Ser. No. 614,336, filed Sept. 17, 1975, for DEVICE FOR ACCELERATING AND TIMING ARTICLES, Lynn D. Crawford, Inventor.

BACKGROUND OF THE INVENTION

This invention relates to conveyor apparatus used to move articles along a predetermined path and rotate each article 90° about a vertical axis such that another side thereof is leading. Frequently such articles as cartons of packaged or frozen food must be rotated for purposes of applying wrappers, identification, et cetera. The rotation of such articles must be achieved in a precise and efficient manner so as not to slow the travel of the articles more than necessary while still assuring that rotation is actually achieved. Naturally if rotation is not achieved, subsequent processing of the article is impossible or ineffective and can result in stoppages of the total conveyor line. It is therefore the object of this invention to provide an efficient and relatively simple apparatus for conveying and rotating articles.

SUMMARY OF THE INVENTION

Apparatus for conveying and turning a train of articles comprising the combination of a horizontal platform for carrying the articles forward in single file order, a bumper positioned in the path of one corner of each said article so as to contact and rotate each article about the one corner and a vertically extending belt positioned to contact the side of the article opposite the bumper to continue pivoting the article while propelling it along the predetermined path in a controlled manner.

DESCRIPTION OF THE DRAWINGS

FIG. 1 is a perspective view of the desired path and positioning of the articles;

FIG. 2 is a perspective view showing the apparatus of the subject invention for moving the articles in the manner shown in FIG. 1.

DESCRIPTION OF THE INVENTION

Figure 3:
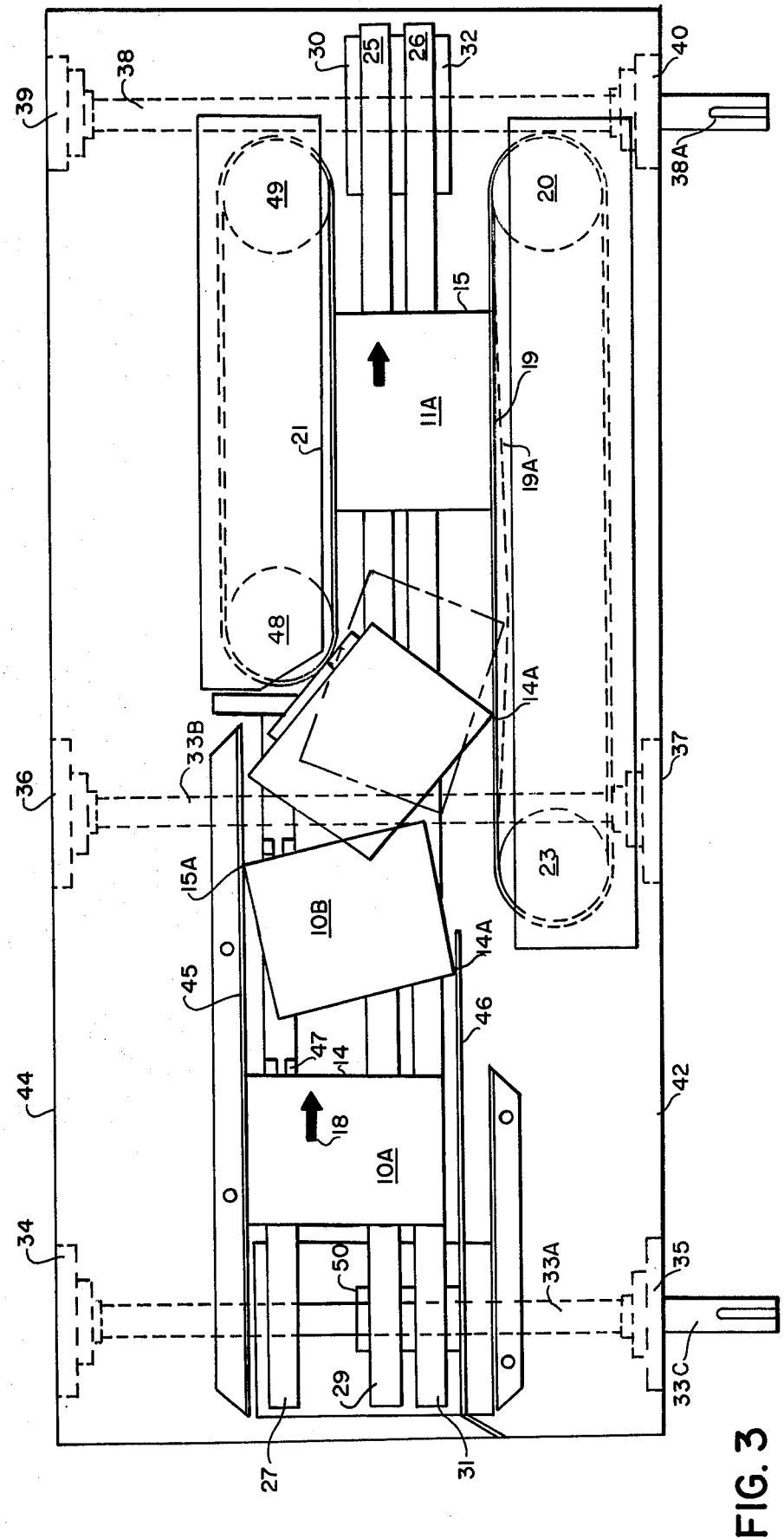
FIG. 3 is a top plan view of the apparatus of FIG. 2.

The invention is described for use in conveying and rotating objects or articles such as the cartons 10 and 11 illustrated in FIG. 1. As shown, these cartons represent food containers for such products as vegetables sold in the frozen state, which are received by the apparatus 12 embodying the invention in the position shown as carton 10. The carton is rectangular and in this illustration has a long edge 14 and a slightly shorter side edge 15. While the carton is shown with these representative dimensions, still the difference in dimensions or the use of the carton are not significant with respect to the invention. In general the invention is provided to receive a carton as it travels along a predetermined path and continues conveyance thereof as it is rotated 90° about a vertical axis in a controlled manner. Thus the carton will be propelled forward in the position of carton 11 in FIG. 1 to exit the apparatus.

In accordance with the invention as shown in one embodiment in FIGS. 2 and 3, the apparatus comprises a platform conveyor 17 for receiving the articles and propelling each along a predetermined path indicated by the arrow 18 (FIG. 3) with the longitudinal edge 14 facing forward. Thereafter a forward corner of each article strikes a bumper 18A which delays forward motion of the corner to cause pivoting of the article as forward motion is continued by the conveyor 17 until the opposite corner 14A contacts a first side facing belt 19 supported about the pulleys 20 and 23 driveably rotated about axes extending upward from the conveyor 17. Contact with this belt causes the corner 14A to be propelled forward resulting in rotation of the article to bring the edge 15 into a leading position, rotation continues until the edge 14 abuts and is parallel to the belt 19. A second vertical belt 21 or guide positioned on the other side of the path for the article from the first belt and extending opposite to and parallel to the first vertical belt stops further rotation of the carton and assists in propelling the carton forward after rotation.

Accordingly the platform conveyor 17 comprises a first drive belt or chain 24, a second belt 25 and a third belt 26 positioned parallel to each other. The belt 24 is supported about pulleys 27 and 28 positioned along the article path for rotation with the horizontally extending shafts 33A and 33B, respectively. Similarly the belt 25 is supported between the pulleys 29 and 30 while the belt 26 is supported between the pulleys 31 and 32. The pulley 27 is fixed for rotation with the drive shaft 33A mounted between the bearings 34 and 35. Similarly the shaft 33B supporting the pulley 28 is supported for rotation between the bearings 36 and 37 while the pulleys 30 and 32 are mounted for rotation with the shaft 38 supported between the bearings 39 and 40. The bearings supporting these shafts are mounted in the frame members 42 and 44, respectively, forming the structural frame for the apparatus.

Means are provided for driving the shafts 33 and 38 by connection to the splined ends 33C and 38A, respectively, of those shafts. Such means can be a motor (not shown) mounted to the frame of the apparatus.

Fixed to opposite sides of the platform conveyor 17 are a first fender or guide 45 and a second fender or guide 46. These guides are spaced apart a distance slightly greater than the length of the side 14 of the article so as to permit passage of the article therebetween. Lugs 47 fixed in spaced relationship on the belt 24 contact the front lefthand corner of each article and assure sufficient spacing between the articles for turning as they are transported along the apparatus. If the articles enter the conveyor 17 at a rate of speed exceeding that of conveyor 17, the lugs 47 slow the article.

As the article passes along the conveyor 17 the front lefthand corner thereof contacts the bumper 18A which slows forward movement of that corner thereby allowing the corner 14A thereof to pivot about the bumper as it is driven forward by the frictional engagement of the belts 29 and 31. The extending article corner 14A thereafter contacts the side facing belt 19. With such contact and because the bumper is configured so as to form a pivot point about which the article turns, the article proceeds with a forward motion while pivoting about the bumper so as to be pressed against the belt 19 thereby deflecting it slightly to the dotted line position 19A shown in FIG. 3. In the manner described, close contact with the article is maintained during pivoting so as to assure efficient, uninterrupted and controlled movement of the article 10A from the position illustrated in FIG. 3 to the position of the article 11A.

Means are provided to stop rotation of each article after it passes or clears the bumper 18 comprising the second side facing belt 21 driveably mounted around a pair of spaced pulleys 48 and 49. Means for power driving the pulleys 20, 23, 48 and 49 can be a gear takeoff from the shaft 38 to the pulleys 20 and 49 (not shown). Thus these belts 19 and 21 have a linear travel equal to that of the belts 25 and 26 so as to continue the controlled conveyance of each article along the predetermined path after rotation about the bumper 18A.

In accordance with another feature of the invention each article is prerotated prior to contacting the bumper so as to facilitate the turning action of the bumper. Accordingly the belts 25 and 26 are driven at a faster linear speed than that of the belt 24 to initially rotate the carton to the approximate position 10B as illustrated in FIG. 3. To achieve this, the pulleys 29 and 31 are driven with the shaft 38 powered through drive means (not shown) connected with the splined end 38A of the shaft. By this drive arrangement, the pulleys 25 and 26 are driven at a faster rate than that of pulley 27 so as to drive the belts 25 and 26 at a slightly greater linear speed than that of the belt 24. Thus the article received on the conveyor 17 if traveling at a higher velocity than the conveyor, will move forward on the belt 24 until it abuts the next lug 47 immediately forward of the article. If the article arrives on the conveyor 17 with a slower forward velocity than the conveyor, it will accelerate to the same speed as the conveyor and rotation will be initiated by the belts 25 and 26. The lugs assure sufficient spacing between the articles for effective rotation.

Thereafter contact with the bumper 18A initiates rotation of the article. Such rotation continues until the opposing corners 14A and 15A of the article contact the guides 45 and 46, respectively, which limits rotation of each article as it is propelled along the conveyor 17. While some slippage between the article and the belts 25 and 26 may occur momentarily during this period, still the article is firmly held between the corners 14A and 15A abutting the adjacent guides. Thereafter contact with the bumper 18A causes a controlled rotation of the article until it is pivoted 90° as illustrated in FIG. 3.

The invention claimed:

1. Apparatus for conveying and rotating a train of articles comprising, in combination:
   a horizontal platform conveyor for carrying each article forward along a predetermined path;
   a bumper positioned in the path of said article to contact a forward corner thereof adjacent a first side of the conveyor to initiate rotation of said article by slowing forward movement of the contacted corner;
   a first side facing belt extending on the second side of said conveyor and supported about pulleys driveably rotated about axes extending upward from the plane of the conveyor, said first side facing belt being positioned to contact and guide the side of said article opposite the bumper for continuing the pivoting of the article about the bumper in a controlled manner;
   first and second fenders on the first and second sides of said conveyor respectively, said fenders being spaced apart a distance slightly greater than the width of the article as it passes therebetween along the conveyor;
   said platform-type conveyor including first and second power driven horizontal belts adjacent said first and second fenders respectively and having a horizontal surface for carrying said articles along said predetermined path;
   means for driving said second horizontal belt at a speed greater than that of the first belt so as to initiate rotation of the article prior to contact with the bumper; and
   said first and second fenders being spaced apart a sufficient distance so as to limit rotation of the article due to the differential speeds between the first and second horizontal belts prior to the article coming in contact with the bumper.

2. Apparatus as defined in claim 1 wherein said side facing belt is positioned to be contacted by the article at a point midway between said pulleys and is positioned a sufficient distance from the bumper so as to contact and squeeze the article prior to movement by the article past the bumper to control its rotation about the bumper.

3. Apparatus as defined in claim 2 wherein said first horizontal belt terminates at the bumper.

4. Apparatus as defined in claim 3 wherein said second horizontal belt extends beyond the bumper and along the predetermined path between the first and second side facing belts.

5. Apparatus as defined in claim 4 wherein said horizontal platform conveyor includes a third belt extending parallel to the second belt and driveably rotated at the same speed as the second belt.

6. Apparatus for conveying and rotating a train of articles comprising, in combination:
   a horizontal platform conveyor for carrying each article forward along a predetermined path;
   a bumper positioned in the path of said article to contact a forward corner thereof adjacent a first side of the conveyor to initiate rotation of said article by slowing forward movement of the contacted corner;
   a first side facing belt extending on the second side of said conveyor and supported about pulleys driveably rotated about axes extending upward from the plane of the conveyor, said first side facing belt being positioned to contact and guide the side of said article opposite the bumper for continuing the pivoting of the article about the bumper in a controlled manner;
   guide means extending parallel to and opposite said first side facing belt and on the first side of said conveyor to terminate pivoting of each article after it clears the bumper in traveling along the predetermined path; and
   said guide means including a second side facing belt extending on the opposite side of and parallel to the first side facing belt for guiding the articles along the predetermined path after contact with the bumper.

* * * * *